(12) United States Patent
Ema et al.

(10) Patent No.: US 11,774,543 B2
(45) Date of Patent: Oct. 3, 2023

(54) EQUIPMENT REGISTRATION TERMINAL, EQUIPMENT REGISTRATION METHOD, AND RECORDING MEDIUM HAVING RECORDED THEREON EQUIPMENT REGISTRATION PROGRAM

(71) Applicant: Yokogawa Electric Corporation, Tokyo (JP)

(72) Inventors: Nobuaki Ema, Tokyo (JP); Yoshitaka Yoshida, Tokyo (JP); Soichiro Konada, Tokyo (JP); Takaaki Matsuda, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 160 days.

(21) Appl. No.: 17/451,004

(22) Filed: Oct. 15, 2021

(65) Prior Publication Data
US 2022/0155406 A1    May 19, 2022

(30) Foreign Application Priority Data
Nov. 16, 2020    (JP) .................................. 2020-190396

(51) Int. Cl.
*G01S 5/02*    (2010.01)
(52) U.S. Cl.
CPC ............ *G01S 5/0244* (2020.05); *G01S 5/021* (2013.01); *G01S 5/0236* (2013.01)
(58) Field of Classification Search
CPC ....... G01S 5/0244; G01S 5/0236; G01S 5/021
(Continued)

(56) References Cited

U.S. PATENT DOCUMENTS 7,626,534 B1 * 12/2009 Boka ..................... G01S 13/726
                                                                      342/451
11,391,835 B2 *  7/2022 Lee ......................... G01S 13/86
(Continued)

FOREIGN PATENT DOCUMENTS

CN      111897897 A  * 11/2020  ......... G01R 29/0807
EP      2237527 A1    10/2010
(Continued)

OTHER PUBLICATIONS

Office Action issued for counterpart Japanese Application No. 2020-190396, issued by the Japanese Patent Office dated Jan. 4, 2023 (dated Dec. 23, 2022).
(Continued)

*Primary Examiner* — Harry K Liu

(57) ABSTRACT

Provided is an equipment registration terminal comprising: a position determination unit configured to determine a position of the equipment registration terminal; a positioning means storage unit configured to store information on a positioning means to determine the position of the equipment registration terminal; an error estimation unit configured to estimate a positioning error in the position of the equipment registration terminal based on the information on the positioning means; and an equipment registration unit configured to register, in registration of a position of equipment to be registered by using the position of the equipment registration terminal, an error in the position of the equipment based on the positioning error, in an associated manner. The positioning means storage unit may store information indicating a positioning method in the positioning means, and the error estimation unit may estimate the positioning error according to the positioning method.

20 Claims, 12 Drawing Sheets

(58) Field of Classification Search
USPC .......................................................... 342/451
See application file for complete search history.

(56) References Cited

U.S. PATENT DOCUMENTS

| | | |
|---|---|---|
| 2011/0098057 A1 | 4/2011 | Edge |
| 2015/0100589 A1 | 4/2015 | Hassan |
| 2015/0358307 A1 | 12/2015 | Ohbitsu |
| 2016/0198286 A1 | 7/2016 | Nakai |
| 2018/0227171 A1 | 8/2018 | Yoshida |
| 2018/0246499 A1 | 8/2018 | Ota |
| 2018/0352069 A1 | 12/2018 | Hirabayashi |
| 2020/0400775 A1* | 12/2020 | Wakana ................ G01S 5/0244 |

FOREIGN PATENT DOCUMENTS

| | | | |
|---|---|---|---|
| JP | 2004102693 A | 4/2004 | |
| JP | 2012524906 A | 10/2012 | |
| JP | 2016139227 A | 8/2016 | |
| JP | 2016540958 A | 12/2016 | |
| JP | 2018128733 A | 8/2018 | |
| JP | 2020046356 A | 3/2020 | |
| WO | 2015040905 A1 | 3/2015 | |

OTHER PUBLICATIONS

Extended European Search Report for European Patent Application No. 21204692.4, issued by the European Patent Office dated Mar. 25, 2022.

* cited by examiner

| POSITIONING MEANS | POSITIONING METHOD | VERSION | POSITIONING RESULTS |
|---|---|---|---|
| 1 | RTK-GPS | Ver. 1.3.8 | ±○cm |
| 2 | DGPS | Ver. 3.1.2 | ±○m |
| 3 | SINGLE POINT POSITIONING GPS | Ver. 9.2.1 | ±○m |
| 4 | BASE STATION POSITIONING | Ver. 5.1.3 | ±○m |
| 5 | WiFi CERTIFIED Location | Ver. 1.7.2 | ±○m |
| 6 | BLE BEACON | Ver. 2.1.3 | ±○m |

FIG. 3

| EQUIPMENT INFORMATION | | POSITION INFORMATION | | | ERROR INFORMATION |
|---|---|---|---|---|---|
| SENSOR ID | CATEGORY | X-COORDINATE | Y-COORDINATE | Z-COORDINATE | POSITIONING ERROR |
| 100a | VIBRATION | Xa | Ya | Za | ±5cm |
| 100b | TEMPERATURE | Xb | Yb | Zb | ±5m |
| 100c | HUMIDITY | Xc | Yc | Zc | ±20m |
| 100d | ILLUMINANCE | Xd | Yd | Zd | ±50m |
| 100e | GAS CONCENTRATION | Xe | Ye | Ze | ±2m |
| 100f | MAGNETIC FIELD | Xf | Yf | Zf | ±5m |
| ⋮ | ⋮ | ⋮ | ⋮ | ⋮ | ⋮ |

*FIG. 5*

| DETERMINA-TION MEANS | DETERMINATION DEVICE | VERSION | CORRECTION INFORMATION ||
|---|---|---|---|---|
| | | | CORRECTION METHOD | CORRECTION TIMING |
| 1 | THREE-AXIS GYRO SENSOR | Ver. 7.1.3 | MARK REFERENCE | 2020/10/07 09:11:00 |
| 2 | SIX-AXIS SENSOR MODULE | Ver. 3.2.1 | COMPLEMENTARY FILTER | 2020/09/19 11:23:00 |
| 3 | NINE-AXIS SENSOR MODULE | Ver. 1.8.5 | KALMAN FILTER | 2020/10/06 14:54:00 |

*FIG. 7*

| EQUIPMENT INFORMATION | | POSITION INFORMATION | | | ERROR INFORMATION | | | |
|---|---|---|---|---|---|---|---|---|
| SENSOR ID | CATEGORY | X-COOR-DINATE | Y-COOR-DINATE | Z-COOR-DINATE | POSITION-ING ERROR | MEASURE-MENT ERROR | DETERMINA-TION ERROR | TOTAL ERROR |
| 100a | VIBRATION | Xa' | Ya' | Za' | ±5cm | ±2mm | ±1° | ... |
| 100b | TEMPERATURE | Xb' | Yb' | Zb' | ±5m | ±2mm | ±1° | ... |
| 100c | HUMIDITY | Xc' | Yc' | Zc' | ±20m | ±10cm | ±1.5° | ... |
| 100d | ILLUMINANCE | Xd' | Yd' | Zd' | ±50m | ±10cm | ±1.5° | ... |
| 100e | GAS CONCENTRATION | Xe' | Ye' | Ze' | ±2m | ±1m | ±2° | ... |
| 100f | MAGNETIC FIELD | Xf' | Yf' | Zf' | ±5m | ±1m | ±2° | ... |
| ... | ... | ... | ... | ... | ... | ... | ... | ... |

*FIG. 9*

| Equipment Information | | Position Information | | | Error Information | Supplementary Information |
|---|---|---|---|---|---|---|
| Sensor ID | Category | X-Coordinate | Y-Coordinate | Z-Coordinate | Positioning Error | |
| 100a | Vibration | Xa | Ya | Za | ±5cm | 1.5 M above manhole |
| 100b | Temperature | Xb | Yb | Zb | ±5m | Behind pipe X |
| 100c | Humidity | Xc | Yc | Zc | ±20m | Near pump Y |
| 100d | Illuminance | Xd | Yd | Zd | ±50m | 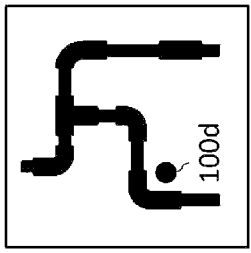 |
| 100e | Gas concentration | Xe | Ye | Ze | ±2m | Mark: Marker m |
| 100f | Magnetic field | Xf | Yf | Zf | ±5m | Mark: Marker n |
| ... | ... | ... | ... | ... | ... | |

FIG. 11

EQUIPMENT REGISTRATION TERMINAL, EQUIPMENT REGISTRATION METHOD, AND RECORDING MEDIUM HAVING RECORDED THEREON EQUIPMENT REGISTRATION PROGRAM

The contents of the following Japanese patent application(s) are incorporated herein by reference:
NO. 2020-190396 filed in JP on Nov. 16, 2020

BACKGROUND

1. Technical Field

The present invention relates to an equipment registration terminal, an equipment registration method, and a recording medium having recorded thereon an equipment registration program.

2 Related Art

Patent Document 1 describes "the current position information of a tablet terminal 40 is inputted as a mounting area of a sensor module 10".

PRIOR ART DOCUMENT

Patent Document

Patent Document 1: Japanese Patent Application Publication No. 2016-139227

SUMMARY (Item 1)
According to a first aspect of the present invention, an equipment registration terminal is provided. The equipment registration terminal may include a position determination unit configured to determine a position of the equipment registration terminal. The equipment registration terminal may include a positioning means storage unit configured to store information on a positioning means to determine the position of the equipment registration terminal. The equipment registration terminal may include an error estimation unit configured to estimate a positioning error in the position of the equipment registration terminal based on the information on the positioning means. The equipment registration terminal may include an equipment registration unit configured to register, in registration of a position of equipment to be registered by using the position of the equipment registration terminal, an error in the position of the equipment based on the positioning error, in an associated manner.

(Item 2) the positioning means storage unit may store information indicating a positioning method in the positioning means, and the error estimation unit may estimate the positioning error according to the positioning method.

(Item 3)
The positioning means storage unit may store information indicating a version in the positioning means, and the error estimation unit may estimate the positioning error according to the version.

(Item 4)
The positioning means storage unit may store information indicating past positioning results in the positioning means; and the error estimation unit may estimate the positioning error according to the positioning results.

(Item 5)
The equipment registration terminal may further include a distance measurement unit configured to measure a distance from the position of the equipment registration terminal to the equipment, wherein the equipment registration unit may register the position of the equipment by further using the distance.

(Item 6)
The equipment registration terminal may further include a measurement means storage unit configured to store information on a measurement means to measure the distance, wherein the error estimation unit may estimate a measurement error in the distance based on the information on the measurement means, and the equipment registration unit may register an error in the position of the equipment further based on the measurement error, in an associated manner.

(Item 7)
The equipment registration terminal may further include an inclination/orientation determination unit configured to determine at least one of an inclination and orientation of the equipment registration terminal in the measurement of the distance, wherein the equipment registration unit may register the position of the equipment by further using at least one of the inclination and orientation.

(Item 8)
The equipment registration terminal may further include a determination means storage unit configured to store information on a determination means to determine at least one of the inclination and orientation, wherein the error estimation unit may estimate a determination error in at least one of the inclination and orientation based on the information on the determination means, and the equipment registration unit may register an error in the position of the equipment further based on the determination error, in an associated manner.

(Item 9)
The determination means storage unit may store correction information indicating information on correction to the determination means, and the error estimation unit may estimate the determination error according to the correction information.

(Item 10)
The equipment registration terminal may further include a supplementary information acquisition unit configured to acquire supplementary information on a place where the position of the equipment registration terminal has been determined, wherein the equipment registration unit may further register the supplementary information.

(Item 11)
The position determination unit may determine the position of the equipment registration terminal by using a satellite positioning system.

(Item 12)
The position determination unit may determine the position of the equipment registration terminal by using an indoor positioning system.

(Item 13)
According to a second aspect of the present invention, an equipment registration method is provided. The equipment registration method may include determining a position of an equipment registration terminal. The equipment registration method may include storing information on a positioning means to determine the position of the equipment registration terminal. The equipment registration method may include estimating a positioning error in the position of the equipment registration terminal based on the information on the positioning means. The equipment registration method may include registering, in registration of a position of equipment to be registered by using the position of the equipment registration terminal, an error in the position of the equipment based on the positioning error, in an associated manner.

(Item 14)

According to a third aspect of the present invention, a recording medium having recorded thereon an equipment registration program is provided. The equipment registration program may be executed by a computer. The equipment registration program may cause the computer to function as a position determination unit configured to determine a position of an equipment registration terminal. The equipment registration program may cause the computer to function as a positioning means storage unit configured to store information on a positioning means to determine the position of the equipment registration terminal. The equipment registration program may cause the computer to function as an error estimation unit configured to estimate a positioning error in the position of the equipment registration terminal based on the information on the positioning means. The equipment registration program may cause the computer to function as an equipment registration unit configured to register, in registration of a position of equipment to be registered by using the position of the equipment registration terminal, an error in the position of the equipment based on the positioning error, in an associated manner.

The summary clause does not necessarily describe all necessary features of the embodiments of the present invention. The present invention may also be a sub-combination of the features described above.

BRIEF DESCRIPTION OF THE DRAWINGS

FIG. 3 shows an example of information on a positioning means stored by the equipment registration terminal 200 according to this embodiment.

FIG. 5 shows an example of registration information of the equipment 100 registered by using the equipment registration terminal 200 according to this embodiment.

FIG. 7 shows an example of information on a determination means stored by an equipment registration terminal 200 according to a variation of this embodiment.

FIG. 9 shows an example of registration information of the equipment 100 registered by using an equipment registration terminal 200 according to a variation of this embodiment.

FIG. 11 shows an example of registration information of the equipment 100 registered by using an equipment registration terminal 200 according to another variation of this embodiment.

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

Figure 1:
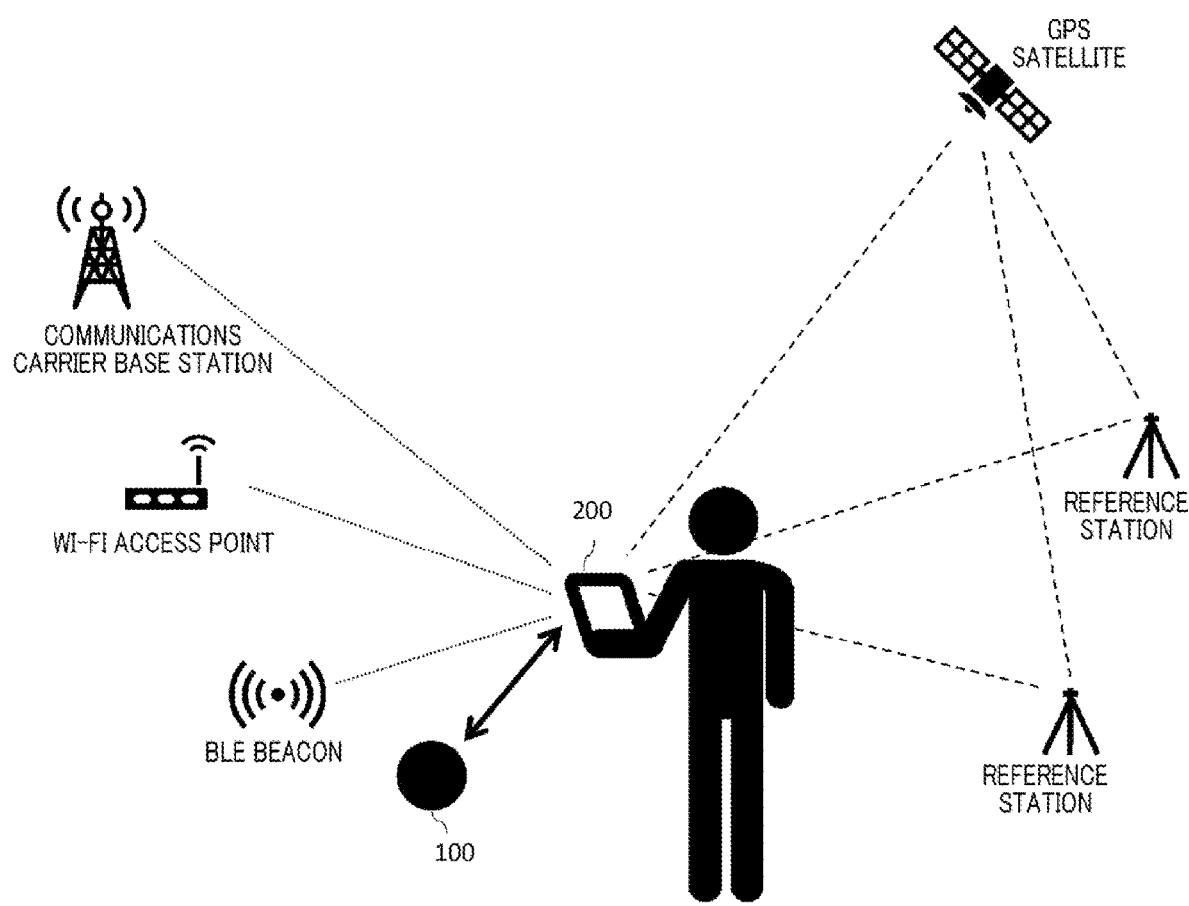
FIG. 1 schematically shows a situation in which a position of equipment 100 is registered by using an equipment registration terminal 200 according to this embodiment.

FIG. 1 schematically shows a situation in which a position of equipment 100 is registered by using an equipment registration terminal 200 according to this embodiment. For example, the equipment registration terminal 200 determines its own position to register a position of the equipment 100 installed in a plant. On this occasion, the equipment registration terminal 200 according to this embodiment estimates a positioning error in the determination of its own position, to register an error in the position of the equipment 100 based on the estimated positioning error, in an associated manner.

Such a plant may be, for example, in addition to an industrial plant such as a chemical plant, a plant for managing and controlling a well site such as a gas field and an oil field and its surroundings, a plant for managing and controlling electric generation of hydraulic power, thermal power, nuclear power, or the like, a plant for managing and controlling energy harvesting from solar power, wind power, or the like, and a plant for managing and controlling water supply and sewerage, a dam, or the like, etc. Note that the above-mentioned description shows, as an example, a case where the equipment 100 installed in the plant is to be registered by the equipment registration terminal 200, but the present invention is not limited thereto. The equipment 100 installed in any place different from the plant may be to be registered by the equipment registration terminal 200.

The equipment 100 may be any tool, implement, machine, and the like for realizing various functions, and may be electrically operated or may be mechanically operated. As an example, the equipment 100 may be a sensor for determining a target physical quantity. Such a sensor may be, for example, an IoT (Internet of Things) sensor that is installed later in the plant. As an example, the sensor may be capable of acquiring determination data obtained by determining a physical quantity of vibration, temperature, humidity, illuminance, odor, gas concentration, pressure, atmospheric pressure, stress, magnetic field, sound, image, and the like in the plant. When such a sensor is installed later, in order to accurately grasp a state of the plant and to efficiently manage the plant, it is important to register a position of the installed sensor. Note that the above-mentioned description shows, as an example, a case where the sensor is an IoT sensor that is installed later in the plant, but the present invention is not limited thereto. For example, the sensor may be a process control (determination) sensor or the like that is installed in advance in an OT (Operational Technology) region and whose position is unregistered, or may be an industrial sensor or the like that is connected to or integrally configured with one or more pieces of field equipment installed in the plant. Hereinafter, a case where the equipment 100 is a sensor installed in the plant will be described as an example.

However, the present invention is not limited thereto. The equipment 100 may include any tool, implement, and machine, for example, an actuator such as a valve and communication equipment such as an IoT antenna.

The sensor equipment registration terminal 200 determines its own position to register the position of the equipment 100. The equipment registration terminal 200 can use various positioning means in the determination of its own position. These positioning means may include various means using, for example, a satellite positioning system such as a GNSS (Global Navigation Satellite System) and an RNSS (Regional Navigation Satellite System), an indoor positioning system, an indoor/outdoor positioning system, and the like. Examples of the satellite positioning system include, for example, an SBAS (Satellite-Based Augmentation System), an RTK (Real Time Kinematic)-GPS (Global Positioning System), a DGPS (Differential GPS), a single point positioning GPS, and the like. Moreover, examples of the indoor positioning system include, for example, a Wi-Fi CERTIFIED Location (registered trademark), BLE (Bluetooth (registered trademark) Low Energy) beacon method, and the like. Moreover, examples of the indoor/outdoor positioning system include, for example, base station positioning and the like using base station information by a telecommunications carrier. Moreover, the positioning means may additionally include, for example, a means using an underwater positioning system such as a USBL (Ultra Short Base Line).

Thus, there are various positioning means as a technique to determine one's own position. Then, these positioning means have different positioning errors. The equipment registration terminal 200 according to this embodiment registers, in the registration of the position of the equipment 100 to be registered, an error in the position of the equipment 100 based on such a positioning error different for each positioning means in an associated manner.

Figure 2:
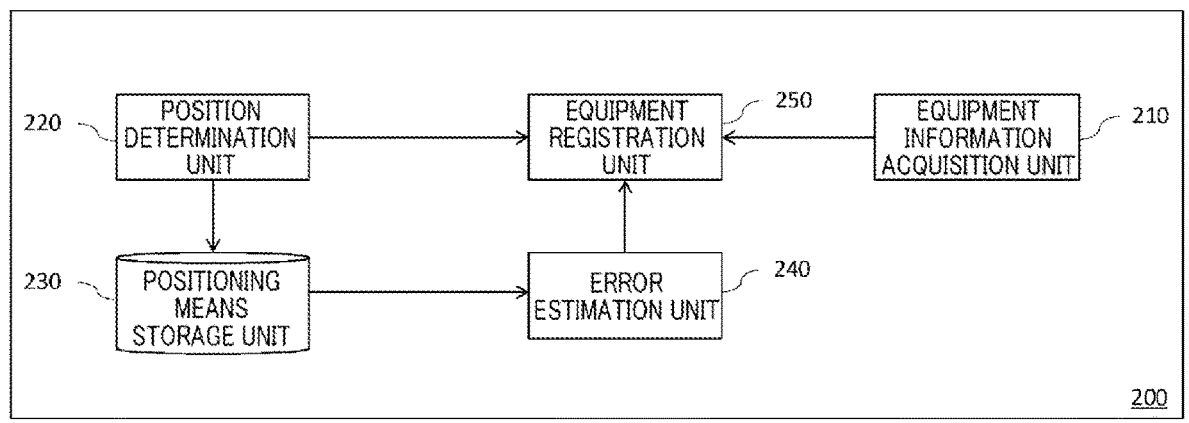
FIG. 2 shows an example of a block diagram of the equipment registration terminal 200 according to this embodiment.

FIG. 2 shows an example of a block diagram of the equipment registration terminal 200 according to this embodiment. The equipment registration terminal 200 may be a computer such as a PC (personal computer), a tablet computer, a smartphone, a workstation, or a general-purpose computer. Moreover, the equipment registration terminal 200 may be implemented in the computer by one or more executable virtual computer environments. Alternatively, the equipment registration terminal 200 may be a dedicated computer designed for registering the equipment 100, or may be a dedicated hardware realized by a dedicated circuit. Moreover, the equipment registration terminal 200 may be realized by various forms. As an example, the equipment registration terminal 200 may be an operation terminal that is directly operated by a worker like a tablet computer, or may be a robot terminal or the like that is remotely operated by a worker like a drone or an ROV (Remote Operated Vehicle) or that autonomously operates.

The equipment registration terminal 200 includes an equipment information acquisition unit 210, a position determination unit 220, a positioning means storage unit 230, an error estimation unit 240, and an equipment registration unit 250. Note that these blocks are functional blocks that are each separated in terms of functions, and do not necessarily have to be consistent with an actual device configuration. That is, even if one block is illustrated in this figure, the block does not necessarily have to consist of one device. Moreover, even if separate blocks are illustrated in this figure, the blocks do not necessarily have to consist of separate devices.

The equipment information acquisition unit 210 acquires equipment information indicating information on the equipment 100 to be registered. For example, when the equipment 100 to be registered is a sensor, the equipment information acquisition unit 210 may acquire, as the equipment information, information such as identification information (sensor ID) for identifying a sensor to be registered, a category of a physical quantity to be determined by the sensor, and network address allocated to the sensor.

As an example, the equipment information acquisition unit 210 may be a code reader, and may acquire the equipment information by reading a bar code, a two-dimensional code, or the like that is attached to or printed on the equipment 100. Moreover, the equipment information acquisition unit 210 may be a communication unit (for example, a tag reader), and may acquire the equipment information by communicating with the equipment 100 (or an RF tag or the like that is attached to or built in the equipment 100). Note that the above-mentioned description shows, as an example, a case where the equipment information acquisition unit 210 acquires the equipment information directly or indirectly from the equipment 100, but the present invention is not limited thereto. The equipment information acquisition unit 210 may acquire the equipment information by receiving it from another apparatus, may acquire the equipment information by reading it from various memory devices or the like, or may acquire the equipment information by accepting a user input. The equipment information acquisition unit 210 supplies the acquired equipment information to the equipment registration unit 250.

The position determination unit 220 determines its own position. The position determination unit 220 may determine its own position by, for example, the RTK-GPS, the DGPS, the single point positioning GPS, and the like. That is, the position determination unit 220 may determine its own position by using the satellite positioning system. Moreover, the position determination unit 220 may determine its own position by, for example, the base station positioning and the like. That is, the position determination unit 220 may determine its own position by using the indoor/outdoor positioning system. Moreover, the position determination unit 220 may determine its own position by, for example, the Wi-Fi CERTIFIED Location, the BLE beacon method, and the like. That is, the position determination unit 220 may determine its own position by using the indoor positioning system. Since these positioning means themselves are widely known techniques, description thereof will be omitted herein.

The position determination unit 220 can determine its own position by one or more means of these various positioning means. The position determination unit 220 supplies, to the equipment registration unit 250, position data (for example, coordinate data) indicating the determined position of its own. On this occasion, when the position determination unit 220 can determine its own position by a plurality of positioning means, it may inform the positioning means storage unit 230 of specification information for specifying a positioning means used in the determination of its own position.

The positioning means storage unit 230 stores information on a positioning means to determine its own position. For example, the positioning means storage unit 230 may store information indicating a positioning method in the positioning means. Moreover, the positioning means storage unit 230 may store information indicating a version in the positioning means. Moreover, the positioning means storage unit 230 may store information indicating past positioning results in the positioning means. Then, when the position determination unit 220 can determine its own position by a plurality of positioning means, the positioning means storage unit 230 may store, for each of a plurality of positioning means, the information indicating the positioning method, the information indicating the version, the information indicating the positioning results, or the like.

The positioning means storage unit 230 supplies the information on the positioning means to the error estimation unit 240. For example, when the specification information for specifying the positioning means is supplied from the position determination unit 220, the positioning means storage unit 230 supplies, to the error estimation unit 240, information on the positioning means specified by the specification information.

The error estimation unit 240 estimates a positioning error in its own position based on the information on the positioning means. For example, the error estimation unit 240 may have in advance a lookup table in which the information on the positioning means and the positioning error are associated with each other. Then, the error estimation unit 240 may refer to the lookup table by using the information on the positioning means supplied from the positioning means storage unit 230, thereby specifying a corresponding positioning error, and estimate the specified positioning error as the positioning error in its own position. Note that the above-mentioned description shows, as an example, a case where the error estimation unit 240 has the lookup table in advance, but the present invention is not limited thereto. When the information on the positioning means is supplied from the positioning means storage unit 230, the error estimation unit 240 may have access to another apparatus (for example, the Internet or the like), to perform a search with the information on the positioning means as a search key, thereby specifying the corresponding positioning error. Alternatively or additionally, the error estimation unit may estimate an positioning error (by, for example, considering an error in the positioning results as the positioning error) according to the positioning results in the information on the positioning means. The error estimation unit 240 supplies error information including the estimated positioning error to the equipment registration unit 250.

The equipment registration unit 250 acquires the equipment information supplied from the equipment information acquisition unit 210. Moreover, the equipment registration unit 250 acquires the position data supplied from the position determination unit 220. Moreover, the equipment registration unit 250 acquires the error information supplied from the error estimation unit 240. Then, the equipment registration unit 250 registers the equipment 100 by using the equipment information, the position data, and the error information. On this occasion, the equipment registration unit 250 registers position information of the equipment 100 to be registered that is indicated by the equipment information, by using position data indicating its own position. As an example, the equipment registration unit 250 may register an installation position as the position of the equipment 100 by considering its own position coordinate indicated by the position data as the installation position of the equipment 100. Alternatively or additionally, the equipment registration unit 250 may register an installation position as the position of the equipment 100 by considering a result obtained by performing a predetermined arithmetic operation on the position data as the installation position of the equipment 100. Moreover, the equipment registration unit 250 may register an installation position as the position of the equipment 100 by considering an area including its own position coordinate indicated by the position data as the installation position of the equipment 100. On this occasion, when the position determination unit 220 can determine its own position by a plurality of positioning means, the equipment registration unit 250 may register the position of the equipment 100 by using a positioning result by the plurality of positioning means.

Moreover, on this occasion, the equipment registration unit 250 registers, in such registration of the position of the equipment 100 to be registered using its own position, an error in the position of the equipment 100 based on the positioning error, in an associated manner. For example, the equipment registration unit 250 may register an error in association with the position of the equipment 100 by considering the positioning error included in the error information as the error in the position of the equipment 100. Alternatively or additionally, the equipment registration unit 250 may register an error in association with the position of the equipment 100 by considering a result obtained by performing a predetermined arithmetic operation on the positioning error included in the error information as the error in the position of the equipment 100.

The equipment registration unit 250 may register, in the registration of the equipment 100, the equipment 100 by writing registration information of the equipment 100 in a database owned by the equipment registration terminal 200 itself. Alternatively or additionally, the equipment registration unit 250 may register the equipment 100 by providing the registration information of the equipment 100 to another apparatus (for example, a server) owning a database for the equipment registration. Note that such a position of the equipment 100 can be directly registered from the outside, without positioning using the equipment registration terminal 200. For example, at the time of manufacturing or engineering, a position in which the equipment 100 is installed may be extracted from CAD data or the like, to register the position in advance as the installation position of the equipment 100.

FIG. 3 shows an example of information on a positioning means stored by the equipment registration terminal 200 according to this embodiment. For example, the positioning means storage unit 230 may store information as shown in this figure, as the information on the positioning means to determine its own position. This figure shows, as an example, a case where the position determination unit 220 can determine its own position by six positioning means. In this case, the positioning means storage unit 230 may store, for each of the six positioning means, the information indicating the positioning method in the positioning means, as shown in this figure. Moreover, the positioning means storage unit 230 may store, for each of the six positioning means, the information indicating the version in the positioning means, as shown in this figure. Moreover, the positioning means storage unit 230 may store, for each of the six positioning means, the information indicating the past positioning results in the positioning means, as shown in this figure.

As shown in this figure, the position determination unit 220 may determine its own position by using the satellite positioning system, may determine its own position by using the indoor positioning system, or may determine its own position by using the indoor/outdoor positioning system. Such registration processing of the equipment 100 using the equipment registration terminal 200 will be described in detail using a flow.

Figure 4:
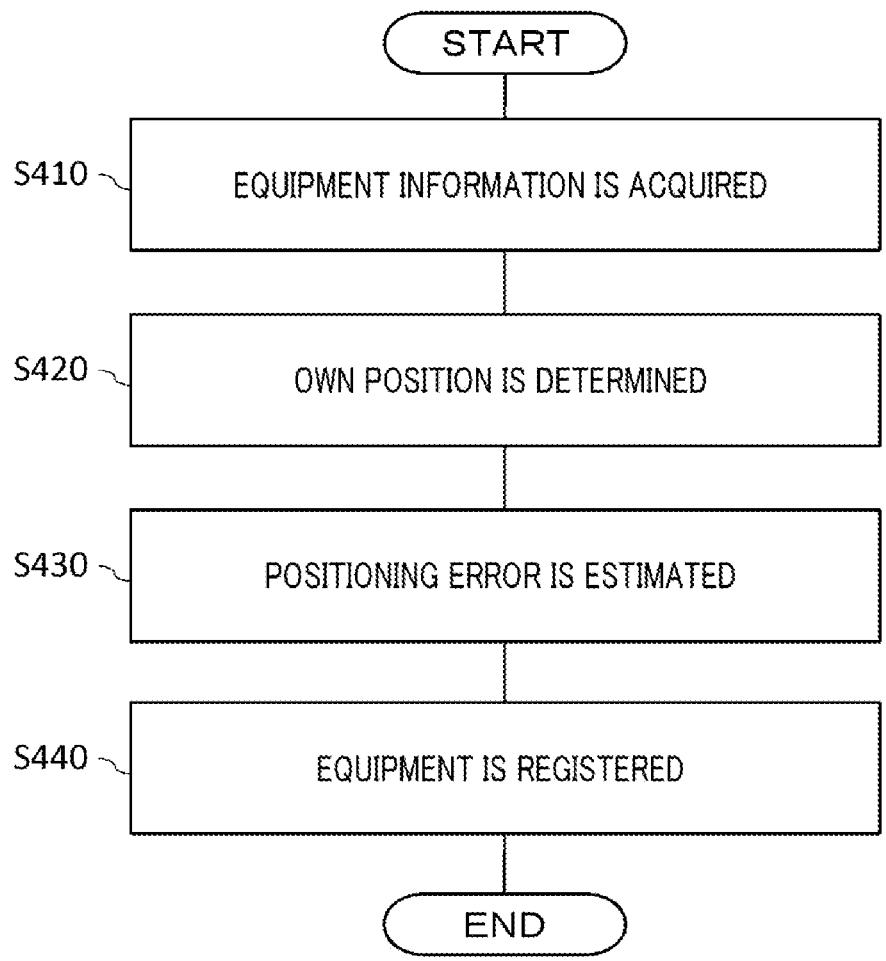
FIG. 4 shows an example of a flow of registering the equipment 100 by using the equipment registration terminal 200 according to this embodiment.

FIG. 4 shows an example of a flow of registering the equipment 100 by using the equipment registration terminal 200 according to this embodiment. For example, the worker brings the equipment registration terminal 200 that is portable, to a place where the equipment 100 to be registered is installed, and activates an equipment registration program.

At Step 410, the equipment registration terminal 200 acquires the equipment information. For example, the worker holds a code reader of the equipment registration terminal 200 over a two-dimensional code attached to the equipment 100. As a result, the equipment information acquisition unit 210 acquires, from the read two-dimensional code, the equipment information indicating information on the equipment 100 to be registered. As an example, when the equipment 100 to be registered is a sensor, the equipment information acquisition unit 210 acquires, as the equipment information, identification information (for example, "SENSOR ID: 100a") for identifying a sensor and category information (for example, "CATEGORY: VIBRATION") of a physical quantity to be determined by the sensor. The equipment information acquisition unit 210 supplies the acquired equipment information to the equipment registration unit 250.

At Step 420, the equipment registration terminal 200 determines its own position. For example, in response to the worker pressing "positioning button" in order to determine a current position, the equipment registration terminal 200 displays available positioning means. Then, in response to the worker selecting one positioning means to be used for the positioning among the available positioning means, the position determination unit 220 determines its own position by using the selected positioning means.

As an example, the equipment registration terminal 200 may display, as the available positioning means, the information on the positioning means as shown in FIG. 3. Then, for example, when "POSITIONING MEANS: 1" is selected by the worker, the position determination unit 220 determines its own position by the RTK-GPS. Then, the position determination unit 220 supplies, to the equipment registration unit 250, the position data (for example, "X-COORDINATE: Xa, Y-COORDINATE: Ya, Z-COORDINATE: Za") indicating the determined position of its own. Moreover, the position determination unit 220 informs the positioning means storage unit 230 of the specification information (for example, "POSITIONING MEANS: 1") for specifying the positioning means used in the determination of its own position.

Note that the above-mentioned description shows, as an example, a case where the positioning means is selected by the worker, the present invention is not limited thereto. The equipment registration terminal 200 may determine its own position by using a recommended positioning means, omitting the selection of the positioning means by the worker.

At Step 430, the equipment registration terminal 200 estimates the positioning error. For example, at Step 420, when the specification information for specifying the positioning means used in the determination of its own position is supplied from the position determination unit 220, the positioning means storage unit 230 supplies, to the error estimation unit 240, information on the determination means specified by the specification information. As an example, when the position determination unit 220 informs the positioning means storage unit 230 of "POSITIONING MEANS: 1" as the specification information, the positioning means storage unit 230 supplies, to the error estimation unit 240, "RTK-GPS" as information indicating a positioning method in "POSITIONING MEANS: 1" and "Ver. 1.3.8" as information indicating a version in "POSITIONING MEANS: 1".

Then, the error estimation unit 240 estimates the positioning error in its own position based on the information on the positioning means supplied from the positioning means storage unit 230. On this occasion, for example, the error estimation unit 240 may estimate the positioning error according to the positioning method. Moreover, the error estimation unit 240 may estimate the positioning error according to the version. As an example, the error estimation unit 240 inputs "RTK-GPS" in "POSITIONING METHOD" field and "Ver. 1.3.8" in "VERSION" field, in the lookup key. As a result, the error estimation unit 240 specifies that a positioning error corresponding to the inputted "POSITIONING METHOD" and "VERSION" is, for example, "±5 cm" by using the lookup table, and estimates the specified positioning error as the positioning error in its own position. The error estimation unit 240 supplies the error information including the estimated positioning error to the equipment registration unit 250. Note that the above-mentioned description shows, as an example, a case where the error estimation unit 240 estimates the positioning error according to the positioning method and the version, but the present invention is not limited thereto. The positioning means storage unit 230 may supply, to the error estimation unit 240, "±0 cm" as information indicating positioning results in "POSITIONING MEANS: 1". Then, the error estimation unit 240 may estimate a positioning error according to the positioning results (by, for example, considering the error in the positioning results as the positioning error).

At Step 440, the equipment registration terminal 200 registers the equipment 100. For example, the equipment registration unit 250 acquires each of the equipment information supplied at Step 410, the position data supplied at Step 420, and the error information supplied at Step 430. Then, the equipment registration unit 250 registers the equipment 100 by using the equipment information, the position data, and the error information. On this occasion, the equipment registration unit 250 registers the position information of the equipment 100 to be registered that is indicated by the equipment information, by using the position data indicating its own position. As an example, the equipment registration unit 250 may register equipment 100a with "SENSOR ID: 100a" and "CATEGORY: VIBRATION" by considering its own position coordinate "X-COORDINATE: Xa, Y-COORDINATE: Ya, Z-COORDINATE: Za" indicated by the position data as an installation position of the equipment 100a.

On this occasion, the equipment registration unit 250 registers, in such registration of the position of the target equipment using its own position, an error in the position of the equipment based on the positioning error, in an associated manner. For example, the equipment registration unit 250 may register an error in association with the position of the equipment 100 by considering the positioning error included in the error information as the error in the position of the equipment 100. As an example, when the positioning error included in the error information is "±5 cm", the equipment registration unit 250 also registers that an error in the position of the equipment 100a "X-COORDINATE: Xa, Y-COORDINATE: Ya, Z-COORDINATE: Za" is "±5 cm". Thus, the equipment registration terminal 200 registers the equipment 100.

FIG. 5 shows an example of registration information of the equipment 100 registered by using the equipment registration terminal 200 according to this embodiment. As shown in this figure, the equipment registration terminal 200 may register each of the equipment information, the position information, and the error information as the registration information of the equipment 100. This figure shows registration information for the equipment 100a to equipment 100f (collectively referred to as "equipment 100") registered by the equipment registration terminal 200. The equipment registration terminal 200 registers, for example, information indicating that the equipment 100a, which is a sensor for determining vibration, is installed at a position "Xa, Ya, Za". Since "POSITIONING MEANS 1" has been used in the registration of the equipment 100a, the equipment registration terminal 200 has also registered a positioning error "±5 cm" corresponding to the positioning method "RTK-GPS" and the version "Ver. 1.3.8". That is, this indicates that the equipment 100a is located in any one of the ranges in "Xa−5 cm to Xa+5 cm, Ya−5 cm to Ya+5 cm, Za−5 cm to Za+5 cm".

Note that the above-mentioned description shows, as an example, a case where positioning errors are the same for all axial directions, but the present invention is not limited thereto. For example, when the positioning error for at least one of the axial directions is different, such as when the positioning error for the horizontal direction and the positioning error for the vertical direction are different, the error estimation unit 240 may estimate the positioning error for each axis. Then, the equipment registration unit 250 may register the positioning error for each axis.

Similarly, The equipment registration terminal 200 registers, for example, information indicating that the equipment 100b, which is a sensor for determining temperature, is installed at a position "Xb, Yb, Zb". Since "POSITIONING MEANS 2" has been used in the registration of the equipment 100b, the equipment registration terminal 200 has also registered the positioning error "±5 m" corresponding to the positioning method "DGPS" and the version "Ver. 3.1.2". Similarly, The equipment registration terminal 200 registers, for example, information indicating that the equipment 100c, which is a sensor for determining humidity, is installed at a position "Xc, Yc, Zc". Since "POSITIONING MEANS 3" has been used in the registration of the equipment 100c, the equipment registration terminal 200 has also registered the positioning error "±20 m" corresponding to the positioning method "SINGLE POINT POSITIONING GPS" and the version "Ver. 9.2.1". Similarly, The equipment registration terminal 200 registers, for example, information indicating that the equipment 100d, which is a sensor for determining illuminance, is installed at a position "Xd, Yd, Zd". Since "POSITIONING MEANS 4" has been used in the registration of the equipment 100d, the equipment registration terminal 200 has also registered the positioning error "±50 m" corresponding to the positioning method "BASE STATION POSITIONING" and the version "Ver. 5.1.3". Similarly, The equipment registration terminal 200 registers, for example, information indicating that the equipment 100e, which is a sensor for determining gas concentration, is installed at a position "Xe, Ye, Ze". Since "POSITIONING MEANS 5" has been used in the registration of the equipment 100e, the equipment registration terminal 200 has also registered the positioning error "±2 m" corresponding to the positioning method "Wi-Fi CERTIFIED Location" and the version "Ver. 1.7.2". Similarly, The equipment registration terminal 200 registers, for example, information indicating that the equipment 100f, which is a sensor for determining magnetic field, is installed at a position "Xf, Yf, Zf". Since "POSITIONING MEANS 6" has been used in the registration of the equipment 100f, the equipment registration terminal 200 has also registered the positioning error "±5 m" corresponding to the positioning method "BLE BEACON" and the version "Ver. 2.1.3".

A technique has been known to register position information of a tablet terminal as a mounting area of a sensor. There are various positioning means as a technique to determine one's own position, as described above. Then, these positioning means have different positioning errors. However, in the prior art, no consideration is given to a positioning error included in the position information of the tablet terminal. On the other hand, the equipment registration terminal 200 according to this embodiment registers, in the registration of the position of the target equipment 100, the error in the position of the equipment 100 based on the positioning error corresponding to the positioning means in an associated manner. As a result, according to the equipment registration terminal 200 of this embodiment, the worker can be informed of how much error is included in the registered position information of the equipment 100. As a result, in a search for the equipment 100 for maintenance such as battery replacement, the worker can grasp, for each equipment 100, which position and range should be searched for. For example, periodic repair or maintenance in a plant or the like is performed at a several-year-scale interval. Therefore, it is possible that positioning technology progresses and workers are changed in the meantime. In this case, even if the worker searches for a range within a radius of 5 cm from the registered position because the positioning error at the time of maintenance is about 5 cm, if the positioning error at the time of registration of the equipment 100 is 5 m, the worker may not be able to find the equipment 100. Even in such a case, according to the equipment registration terminal 200 of this embodiment, information indicating what error is included in the registered position of the equipment 100 is also provided, so that the worker can find the equipment 100 relatively easily.

Moreover, the equipment registration terminal 200 according to this embodiment stores information indicating a positioning method, information indicating a version, and information indicating past positioning results in a positioning means, and estimates a positioning error according to the positioning method, the version, and the positioning results. Generally, the positioning error may differ depending on the positioning method. Moreover, even with the same positioning method, the positioning error may differ depending on the version. According to the equipment registration terminal 200 of this embodiment, the positioning error is estimated in consideration of such information as well, so that the error can be estimated with high accuracy for registration. Moreover, according to the equipment registration terminal 200 of this embodiment, the positioning error is estimated in consideration of the past results as well, so that the error can be estimated according to an experimental rule for registration.

Moreover, the equipment registration terminal 200 according to this embodiment uses, in the determination of its own position, the satellite positioning system, the indoor/outdoor positioning system, and the indoor positioning system. As a result, according to the equipment registration terminal 200 of this embodiment, its own position can be globally determined by an artificial satellite, and its own position can be determined even in a plant or a warehouse where positioning by the artificial satellite is difficult, so that the equipment 100 installed in such a place can also be to be registered.

Figure 6:
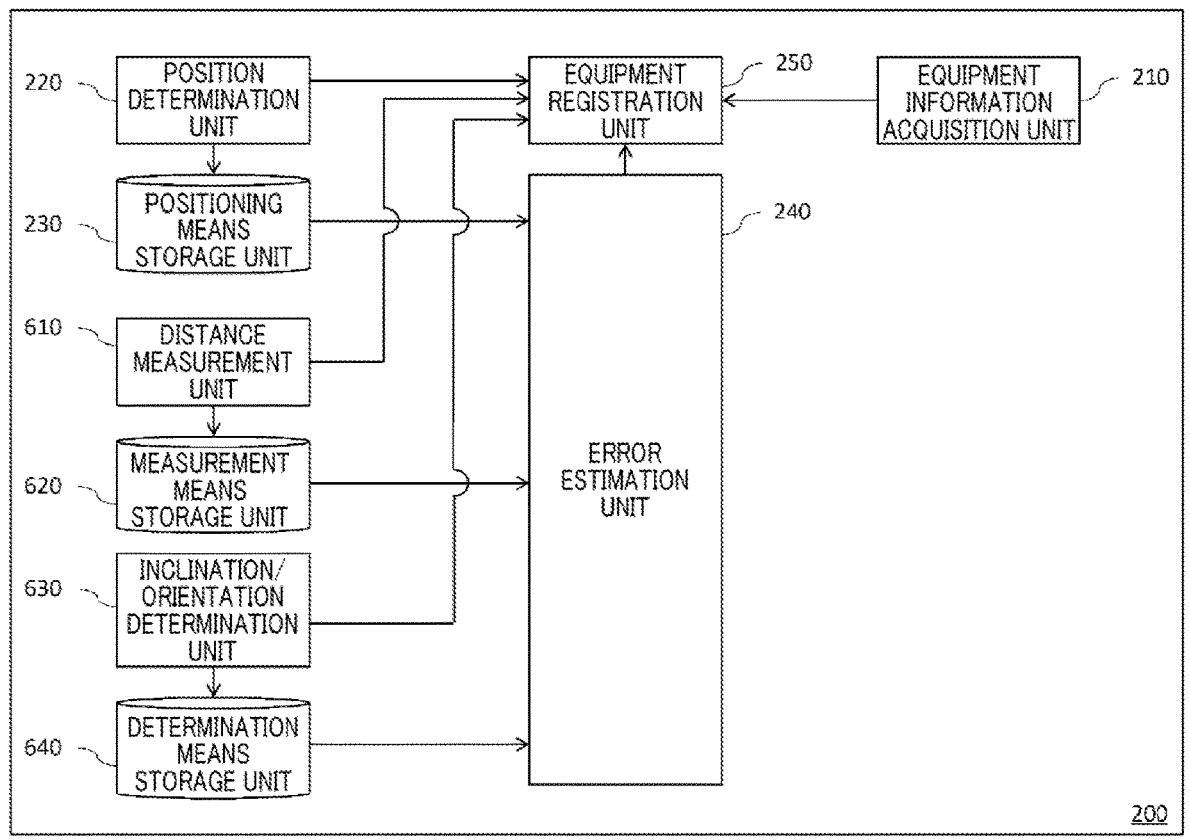
FIG. 6 shows an example of a block diagram of an equipment registration terminal 200 according to a variation of this embodiment.

FIG. 6 shows an example of a block diagram of an equipment registration terminal 200 according to a variation of this embodiment. In FIG. 6, the same reference numerals are given to components having the same functions and configurations as those in FIG. 2, and description thereof will be omitted except for the following differences. The above-mentioned description shows, as an example, a case where the equipment registration terminal 200 registers the position information of the equipment 100 to be registered by using only the position data indicating its own position. However, the equipment registration terminal 200 according to this variation registers the position information of the equipment 100 to be registered, in consideration of not only its own position but also a distance from its own position to the equipment 100 and its own inclination and orientation in the measurement of the distance. The equipment registration terminal 200 according to this variation further includes a distance measurement unit 610, a measurement means storage unit 620, an inclination/orientation determination unit 630, and a determination means storage unit 640.

The distance measurement unit 610 measures the distance from its own position to the equipment 100 to be registered. The distance measurement unit 610 may measure the distance to the equipment 100 based on, for example, received signal strength of a signal communicated with the equipment 100. Alternatively or additionally, the distance measurement unit 610 may measure the distance to the equipment 100 based on, for example, time it takes for a laser beam applied toward the equipment 100 to be reflected and returned. Moreover, the distance measurement unit 610 may measure the distance to the equipment 100 based on, for example, an image obtained by image-capturing the equipment 100. Moreover, a transmitter for measurement may be temporarily installed near the equipment 100, and the distance measurement unit 610 may measure the distance to the equipment 100 by communicating with the transmitter,
Thus, even when the equipment 100 has no communication means with the equipment registration terminal 200, the distance measurement unit 610 can measure the distance to the equipment 100. The distance measurement unit 610 can measure the distance to the equipment 100 by one or more means of these various measurement means. The distance measurement unit 610 supplies, to the equipment registration unit 250, distance data indicating the measured distance to the equipment 100. On this occasion, when the distance measurement unit 610 can measure the distance to the equipment 100 by a plurality of measurement means, it may inform the measurement means storage unit 620 of specification information for specifying a measurement means used in the measurement of the distance to the equipment 100.

The measurement means storage unit 620 stores information on a measurement means to measure the distance from its own position to the equipment 100 to be registered. For example, the measurement means storage unit 620 may store information indicating a measurement method in the measurement means. Moreover, the measurement means storage unit 620 may store information indicating a version in the measurement means. Moreover, the measurement means storage unit 620 may store information indicating past measurement results in the measurement means. Since the same applies to the positioning means storage unit 230, description thereof will be omitted.

The measurement means storage unit 620 supplies the information on the measurement means to the error estimation unit 240. For example, when the specification information for specifying the measurement means is supplied from the distance measurement unit 610, the measurement means storage unit 620 supplies, to the error estimation unit 240, information on the measurement means specified by the specification information.

The inclination/orientation determination unit 630 determines at least one of its own inclination and orientation in the measurement of the distance from its own position to the equipment 100 to be registered. For example, the inclination/orientation determination unit 630 may determine its own inclination and orientation by using a three-axis gyro sensor. Moreover, the inclination/orientation determination unit 630 may determine its own inclination and orientation by using a six-axis sensor module that combines a three-axis acceleration sensor and a three-axis gyro sensor. Moreover, the inclination/orientation determination unit 630 may determine its own inclination and orientation by using a nine-axis sensor module that combines a three-axis acceleration sensor, a three-axis gyro sensor, and a three-axis compass sensor. The inclination/orientation determination unit 630 can determine its own inclination and orientation by one or more means of these various determination means. The inclination/orientation determination unit 630 supplies, to the equipment registration unit 250, inclination/orientation data indicating the determined inclination and orientation of its own. On this occasion, when the inclination/orientation determination unit 630 can determine its own inclination and orientation by a plurality of determination means, it may inform the determination means storage unit 640 of specification information for specifying a determination means used in the determination of its own inclination and orientation.

The determination means storage unit 640 stores information on a determination means to determine at least one of its own inclination and orientation. For example, the determination means storage unit 640 may store information indicating a device in the determination means. Moreover, the determination means storage unit 640 may store information indicating a version in the determination means. Moreover, the determination means storage unit 640 may store information indicating past determination results in the determination means. The determination means storage unit 640 may additionally store correction information indicating information on correction to the determination means. Generally, a gyro sensor accumulates drift errors over time. Moreover, in a place with a lot of metals such as a plant, geomagnetism cannot be accurately determined and an error may be caused. As such, the determination means may be corrected. As such correction, various methods may be used, such as correction using a complementary filter or a Kalman filter, or correction referring to an existing mark (a marker or the like), for example. Therefore, the determination means storage unit 640 may store the correction information indicating the information on the correction to the determination means this way. As an example, the determination means storage unit 640 may store, as the correction information, information indicating a method of the correction to the determination means and the latest timing at which the correction has been performed, or the like.

The determination means storage unit 640 supplies the information on the determination means to the error estimation unit 240. For example, when the specification information for specifying the determination means is supplied from the inclination/orientation determination unit 630, the determination means storage unit 640 supplies, to the error estimation unit 240, the information on the determination means specified by the specification information.

In this variation, the error estimation unit 240 further estimates, based on the information on the measurement means, a measurement error in the distance from its own position to the equipment 100 to be registered. Moreover, the error estimation unit 240 further estimates, based on the information on the determination means, a determination error in at least one of the inclination and orientation. On this occasion, the error estimation unit 240 may estimate the determination error according to the correction information included in the information on the determination means. The error estimation unit 240 supplies, to the equipment registration unit 250, error information including not only the estimated positioning error but also the measurement error and the determination error.

In this variation, the equipment registration unit 250 further acquires the distance data supplied from the distance measurement unit 610. Moreover, the equipment registration unit 250 further acquires the inclination/orientation data supplied from the inclination/orientation determination unit 630. Moreover, the equipment registration unit 250 acquires, from the error estimation unit 240, error information including not only the positioning error but also the measurement error and the determination error. Then, the equipment registration unit 250 registers the position of the equipment 100 by further using the distance from its own position to the equipment 100 to be registered. Moreover, the equipment registration unit 250 registers the position of the equipment 100 by further using at least one of its own inclination and orientation in the measurement of the distance to the equipment 100. For example, the equipment registration unit 250 may register, as the position of the equipment 100, a position that is separated by the distance indicated by the distance data from its own position coordinate indicated by the position data to the inclination direction and orientation indicated by the inclination/orientation data. On this occasion, the equipment registration unit 250 registers an error in the position of the equipment 100 further based on the measurement error, in an associated manner. Moreover, the equipment registration unit 250 registers an error in the position of the equipment 100 further based on the determination error, in an associated manner. As an example, the equipment registration unit 250 may register the error based on the positioning error, the error based on the measurement error, and the error based on the determination error, in an associated manner. Alternatively or additionally, the equipment registration unit 250 may register a total error obtained by summing up the error based on the positioning error, the error based on the measurement error, and the error based on the determination error, in an associated manner.

FIG. 7 shows an example of information on a determination means stored by an equipment registration terminal 200 according to a variation of this embodiment. For example, the determination means storage unit 640 may store information as shown in this figure, as information on a determination means to determine its own inclination and orientation. This figure shows, as an example, a case where the inclination/orientation determination unit 630 can determine its own inclination and orientation by three determination means. In this case, the determination means storage unit 640 may store, for each of the three determination means, information indicating a device in the determination means, as shown in this figure. Moreover, the determination means storage unit 640 may store information indicating a version in the determination means. Moreover, the determination means storage unit 640 may store information indicating past determination results in the determination means, although illustration thereof is omitted in this figure. The determination means storage unit 640 may additionally store the correction information indicating the information on the correction to the determination means. The determination means storage unit 640 may store, as such correction information, the information indicating the method of the correction to the determination means and the latest timing at which the correction has been performed, or the like. Such registration processing of the equipment 100 using the equipment registration terminal 200 according to a variation will be described in detail using a flow.

Figure 8:
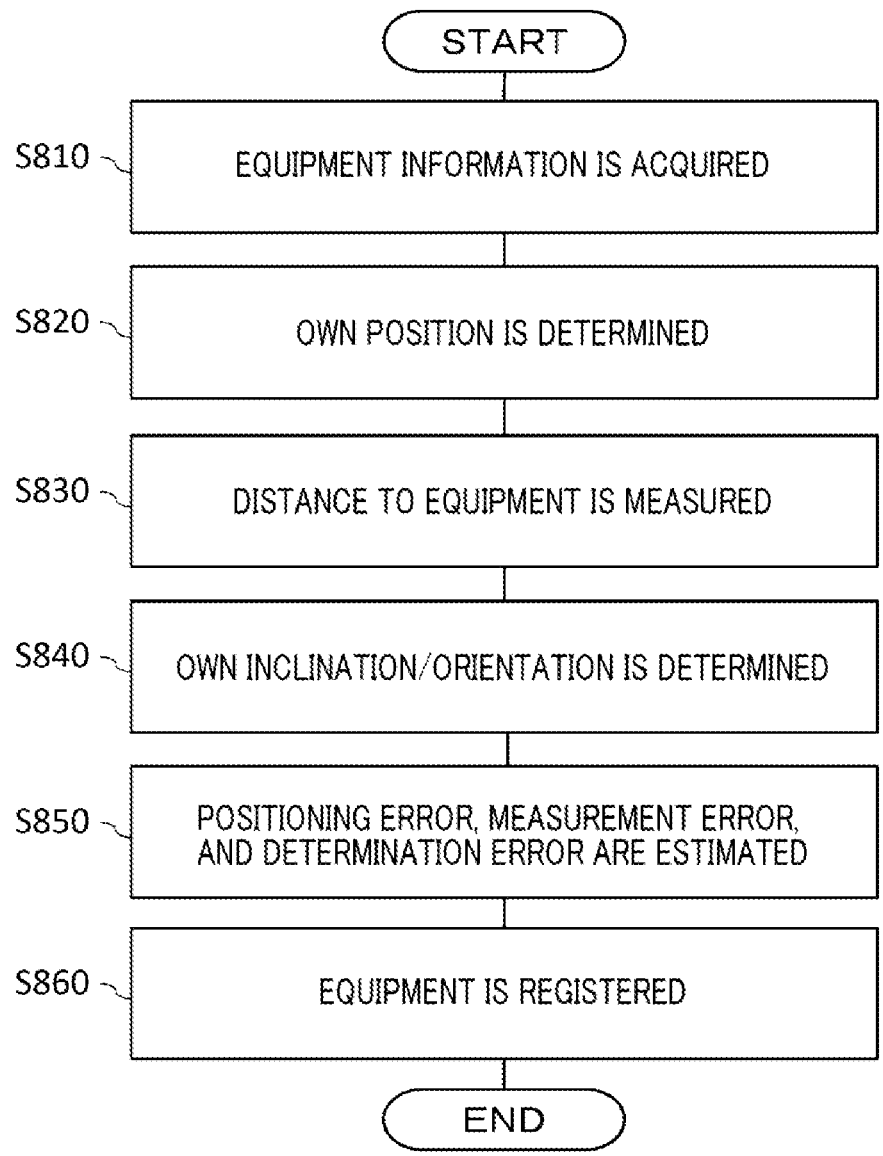
FIG. 8 shows an example of a flow of registering the equipment 100 by using an equipment registration terminal 200 according to a variation of this embodiment.

FIG. 8 shows an example of a flow of registering the equipment 100 by using an equipment registration terminal 200 according to a variation of this embodiment. Since processing of steps up to Step 820 is the same as the processing of Step 420 in FIG. 4, description thereof will be omitted herein.

At Step 830, the equipment registration terminal 200 measures the distance to the equipment 100. For example, in response to the worker pressing a "measurement button" in order to measure a distance, the equipment registration terminal 200 displays available measurement means. Then, in response to the worker selecting one measurement means to be used for the measurement among the available measurement means, the distance measurement unit 610 measures the distance from its own position to the equipment 100 to be registered, by using the selected measurement means. For example, when "MEASUREMENT MEANS: 2 (a laser)" is selected by the worker, the distance measurement unit 610 applies a laser beam toward the equipment 100, and measures the distance to the equipment 100 based on the time it takes for the applied laser beam to be reflected and returned. Then, the distance measurement unit 610 supplies, to the equipment registration unit 250, the distance data (for example, "1.5 m") indicating the measured distance to the equipment 100. Moreover, the distance measurement unit 610 informs the measurement means storage unit 620 of the specification information (for example, "MEASUREMENT MEANS: 2") for specifying the measurement means used in the measurement of the distance to the equipment 100.

Note that the above-mentioned description shows, as an example, a case where the measurement means is selected by the worker, but the present invention is not limited thereto. The equipment registration terminal 200 may measure the distance to the equipment 100 by using a recommended measurement means, omitting the selection of the measurement means by the worker.

At Step 840, the equipment registration terminal 200 determines its own inclination and orientation. For example, in response to the worker pressing a "determination button" in order to determine an inclination and orientation, the equipment registration terminal 200 displays available determination means. Then, in response to the worker selecting one determination means to be used for the determination among the available determination means, the inclination/orientation determination unit 630 determines at least one of its own inclination and orientation in the measurement of the distance from its own position to the equipment 100 to be registered, by using the selected determination means. As an example, the equipment registration terminal 200 may display, as the available determination means, the information on the determination means as shown in FIG. 7. Then, for example, when "DETERMINATION MEANS: 3 (nine-axis)" is selected by the worker, the inclination/orientation determination unit 630 determines its own inclination and orientation by using a nine-axis sensor module. Then, the inclination/orientation determination unit 630 supplies, to the equipment registration unit 250, inclination/orientation data indicating the determined inclination and orientation of its own. Moreover, the inclination/orientation determination unit 630 informs the determination means storage unit 640 of the specification information (for example, "DETERMI- NATION MEANS: 3") for specifying the determination means used in the determination of its own inclination and orientation.

Note that the above-mentioned description shows, as an example, a case where the determination means is selected by the worker, the present invention is not limited thereto. The equipment registration terminal 200 may determine its own inclination and orientation by using a recommended determination means, omitting the selection of the determination means by the worker.

At Step 850, the equipment registration terminal 200 estimates not only the positioning error but also the measurement error and the determination error. For example, at Step 830, when the specification information for specifying the measurement means used in the measurement of the distance to the equipment 100 is supplied from the distance measurement unit 610, the measurement means storage unit 620 supplies, to the error estimation unit 240, the information on the measurement means specified by the specification information. Similarly, at Step 840, when the specification information for specifying the determination means used in the determination of its own inclination and orientation is supplied from the inclination/orientation determination unit 630, the determination means storage unit 640 supplies, to the error estimation unit 240, the information on the determination means specified by the specification information.

Then, the error estimation unit 240 estimates the measurement error in the distance to the equipment 100 based on the information on the measurement means supplied from the measurement means storage unit 620. Similarly, the error estimation unit 240 estimates the determination error in its own inclination and orientation based on the information on the determination means supplied from the determination means storage unit 640. On this occasion, the error estimation unit 240 may estimate the determination error according to the correction information included in the information on the determination means. Since the estimation of the measurement error and the determination error is the same as the estimation of the positioning error, description thereof will be omitted herein. The error estimation unit 240 supplies, to the equipment registration unit 250, the error information including not only the estimated positioning error but also the measurement error and the determination error.

At Step 860, the equipment registration terminal 200 registers the equipment 100. For example, the equipment registration unit 250 acquires each of the equipment information supplied at Step 810, the position data supplied at Step 820, the distance data supplied at Step 830, the inclination/orientation data supplied at Step 840, and the error information supplied at Step 850. Then, the equipment registration unit 250 registers the equipment 100 by using the equipment information, the position data, the distance data, the inclination/orientation data, and the error information. On this occasion, the equipment registration unit 250 registers the position information of the equipment 100 to be registered that is indicated by the equipment information, by using the position data indicating its own position. Moreover, the equipment registration unit 250 registers the position of the equipment 100 by further using the distance from its own position to the equipment 100 to be registered. Moreover, the equipment registration unit 250 registers the position of the equipment 100 by further using at least one of its own inclination and orientation in the measurement of the distance to the equipment 100. For example, the equipment registration unit 250 may register, as the position of the equipment 100, a position that is separated by the distance indicated by the distance data from its own position coordinate indicated by the position data to the inclination direction and orientation indicated by the inclination/orientation data.

On this occasion, the equipment registration unit 250 registers the error in the position of the equipment 100 further based on the measurement error, in an associated manner. Moreover, the equipment registration unit 250 registers the error in the position of the equipment 100 further based on the determination error, in an associated manner. As an example, the equipment registration unit 250 may register the error based on the positioning error, the error based on the measurement error, and the error based on the determination error, in an associated manner. Alternatively or additionally, the equipment registration unit 250 may register the total error obtained by summing up the error based on the positioning error, the error based on the measurement error, and the error based on the determination error, in an associated manner. Thus, the equipment registration terminal 200 according to this variation registers the equipment 100.

FIG. 9 shows an example of registration information of the equipment 100 registered by using an equipment registration terminal 200 according to a variation of this embodiment. As shown in this figure, the equipment registration terminal 200 according to this variation may register, as the error information, the error based on the positioning error, the error based on the measurement error, and the error based on the determination error, in an associated manner. Moreover, the equipment registration terminal 200 may register the total error obtained by summing up the error based on the positioning error, the error based on the measurement error, and the error based on the determination error, in an associated manner. On this occasion, the equipment registration terminal 200 may register, in the registration of such a total error, the total error for each of the axial directions.

The equipment registration terminal 200 according to this variation registers the position of the equipment 100 by further using the distance from its own position to the equipment 100 as well as its own inclination and orientation in the measurement of the distance. As a result, according to the equipment registration terminal 200 of this variation, the position of the equipment 100 can be registered by roughly specifying in which direction and how far away the equipment 100 is installed from its own position, rather than considering its own position as the installation position of the equipment 100. Thus, giving consideration not only to the position but also to the distance and the inclination/orientation allows the equipment registration terminal 200 according to this variation to specify a three-dimensional coordinate of the equipment 100 for the registration.

Moreover, the equipment registration terminal 200 according to this variation estimates a measurement error and a determination error according to the information on the measurement means to measure the distance and the information on the determination means to determine the inclination and orientation, and registers an error of the position of the equipment 100 based on the measurement error and the determination error as well, in an associated manner. As a result, according to the equipment registration terminal 200 of this variation, in the registration of the position of the equipment 100 further using the distance as well as the inclination and orientation, the error information can be registered including the measurement error in the distance and the determination error in the inclination and orientation.

Moreover, the equipment registration terminal 200 according to this variation stores, as the information on the determination means, the correction information indicating the information of the correction to the determination means, and estimates the determination error according to the correction information. Generally, even with the same determination device, the determination error may differ depending on a situation of the correction. According to the equipment registration terminal 200 of this variation, the determination error is estimated in consideration of such information as well, so that the error can be estimated with high accuracy for registration.

Figure 10:
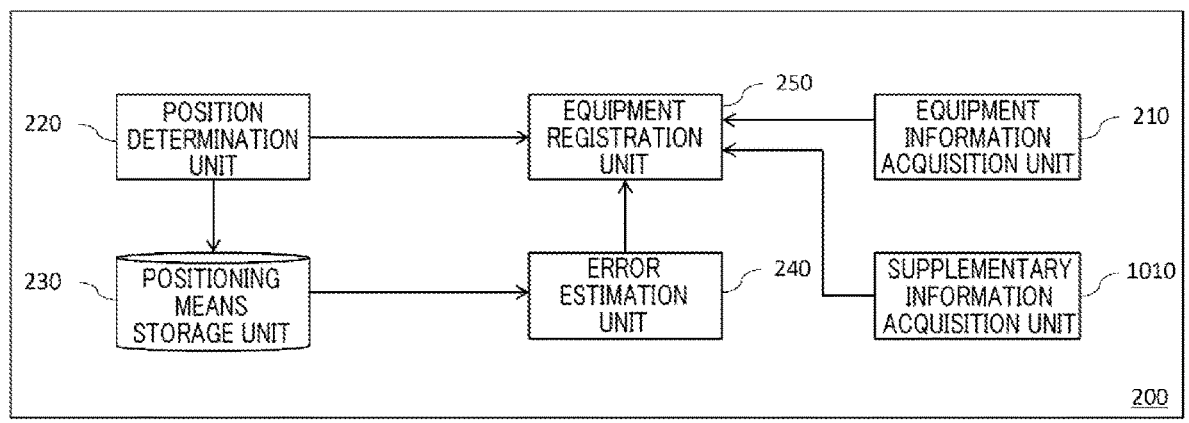
FIG. 10 shows an example of a block diagram of an equipment registration terminal 200 according to another variation of this embodiment.

FIG. 10 shows an example of a block diagram of an equipment registration terminal 200 according to another variation of this embodiment. In FIG. 10, the same reference numerals are given to components having the same functions and configurations as those in FIG. 2, and description thereof will be omitted except for the following differences. The equipment registration terminal 200 according to this another variation further includes a supplementary information acquisition unit 1010. Note that this figure shows, as an example, a case where the equipment registration terminal 200 according to this embodiment shown in FIG. 2 further includes the supplementary information acquisition unit 1010, but the equipment registration terminal 200 according to a variation of this embodiment shown in FIG. 6 may include the supplementary information acquisition unit 1010.

The supplementary information acquisition unit 1010 acquires supplementary information on a place where its own position has been determined. The supplementary information acquisition unit 1010 may acquire the supplementary information by, for example, accepting a user input, may acquire the supplementary information by receiving it from another apparatus, or may acquire the supplementary information by image-capturing an image. The supplementary information acquisition unit 1010 supplies the acquired supplementary information to the equipment registration unit 250.

In the equipment registration terminal 200 according to this another variation, the equipment registration unit 250 further registers, as the registration information, the supplementary information supplied from the supplementary information acquisition unit 1010.

FIG. 11 shows an example of registration information of the equipment 100 registered by using an equipment registration terminal 200 according to another variation of this embodiment. In FIG. 10, the same reference numerals are given to the same items and parameters as those in FIG. 5, and description thereof will be omitted except for the following differences. The equipment registration terminal 200 according to this another variation further registers, as the registration information, not only the equipment information, the position information, and the error information but also the supplementary information, as shown in this figure. For example, the equipment registration terminal 200 may register, as the supplementary information, information for specifying in more detail the place where its own position has been determined in order to register the position of the equipment 100, such as "1.5 m ABOVE MANHOLE", "BEHIND PIPE X", and "NEAR PUMP Y". Moreover, for example, the equipment registration terminal 200 may register, as the supplementary information, information such as a photograph of a site in the determination of its own position. Moreover, for example, when a reference is made to the existing mark (marker) to correct the determination means, the equipment registration terminal 200 may register information on the mark as the supplementary information.

The equipment registration terminal 200 according to this another variation acquires and registers the supplementary information on the place where its own position has been determined. As a result, according to the equipment registration terminal 200 of this another variation, information can be provided for specifying the position of the equipment 100 in more detail.

Thus, according to the equipment registration terminal 200 of this embodiment, in the registration of the position of the equipment 100 to be registered, an error is registered in an associated manner, but such an error may be changed over various ranges according to a means to determine a position, a means to measure a distance, and a means to determine an inclination and orientation. Such a change may include not only a case where the error is changed to be decreased with a technology progress but also a case where the error is changed to be increased. For example, there may be a case where, even though the position could be determined with high accuracy by the DGPS in the past, no more supplementary situation of a DGPS reference station is acquired now due to an obstacle, and there is no choice but to perform positioning with the single point positioning GPS. The equipment registration terminal 200 may further include a notification unit (for example, an alarm) that provides, in such a case where a current error is larger than a past error, a notification of the case. As a result, according to the equipment registration terminal 200, the worker can be informed of the fact that the estimated error is larger than the past error.

Various embodiments of the present invention may be described with reference to flowcharts and block diagrams, whose blocks may represent (1) steps of processes in which operations are executed or (2) units of apparatuses responsible for executing operations. Certain steps and units may be implemented by a dedicated circuit, a programmable circuit supplied with a computer-readable instruction stored on a computer-readable medium, and/or a processor supplied with the computer-readable instruction stored on the computer-readable medium. The dedicated circuit may include a digital and/or analog hardware circuit, and may include an integrated circuit (IC) and/or a discrete circuit. The programmable circuit may include a reconfigurable hardware circuit including, for example, a logical AND, a logical OR, a logical XOR, a logical NAND, a logical NOR, and other logical operations, as well as a memory element such as a flip-flop, a register, a field-programmable gate array (FPGA), a programmable logic array (PLA), or the like.

The computer-readable medium may include any tangible device that can store an instruction for execution by a suitable device, so that the computer-readable medium having an instruction stored thereon is provided with an article of manufacture including an instruction which may be executed in order to create a means to execute an operation designated in the flowcharts or the block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disk, a memory stick, an integrated circuit card, and the like.

The computer-readable instruction may include an assembler instruction, an instruction-set-architecture (ISA) instruction, a machine instruction, a machine dependent instruction, a microcode, a firmware instruction, state-setting data, or either a source code or an object code written in any combination of one or more programming languages, including an object-oriented programming language such as Smalltalk (registered trademark), JAVA (registered trademark), C++, or the like, and a conventional procedural programming language such as a "C" programming language or a similar programming language.

The computer-readable instruction may be provided to a programmable circuit or a processor of a general-purpose computer, a special-purpose computer, or other programmable data processing apparatuses, locally or via a local area network (LAN), a wide area network (WAN) such as the Internet or the like, and the computer-readable instruction may be executed in order to create the means to execute the operation designated in the flowcharts or the block diagrams. Examples of the processor include a computer processor, a processing unit, a microprocessor, a digital signal processor, a controller, a microcontroller, and the like.

Figure 12:
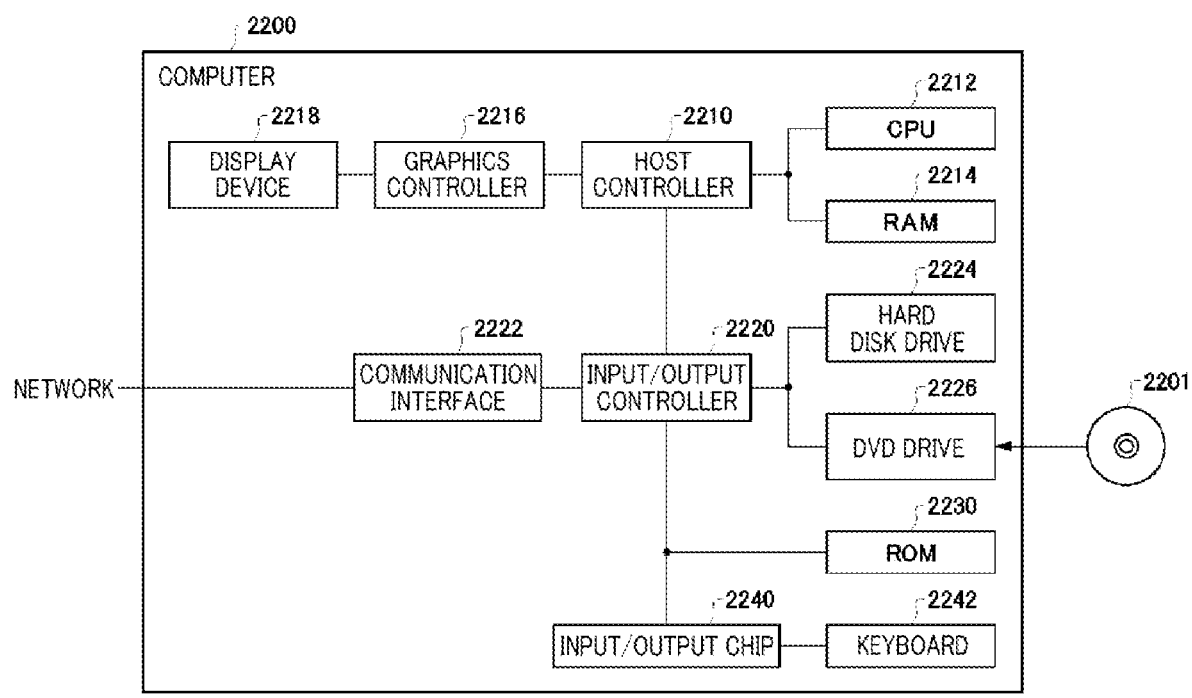
FIG. 12 shows an example of a computer 2200 in which a plurality of aspects of the present invention may be entirely or partially embodied.

FIG. 12 shows an example of a computer 2200 in which a plurality of aspects of the present invention may be entirely or partially embodied. A program that is installed in the computer 2200 can cause the computer 2200 to function as or execute an operation correlated with an apparatus according to an embodiment of the present invention or one or more units of the apparatus, and/or can cause the computer 2200 to execute a process according to an embodiment of the present invention or steps of the process. Such a program may be executed by a CPU 2212 in order to cause the computer 2200 to execute a specific operation correlated with some or all of the blocks of the flowcharts and the block diagrams described herein.

The computer 2200 according to this embodiment includes the CPU 2212, a RAM 2214, a graphics controller 2216, and a display device 2218, which are mutually connected by a host controller 2210. The computer 2200 also includes an input/output unit such as a communication interface 2222, a hard disk drive 2224, a DVD-ROM drive 2226, and an IC card drive, which are connected to the host controller 2210 via an input/output controller 2220. The computer also includes a legacy input/output unit such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 acquires image data generated by the CPU 2212 on a frame buffer or the like provided in the RAM 2214 or in itself, such that the image data is displayed on the display device 2218.

The communication interface 2222 communicates with another electronic device via a network. The hard disk drive 2224 stores a program and data used by the CPU 2212 in the computer 2200. The DVD-ROM drive 2226 reads the program or the data from a DVD-ROM 2201, and provides the program or the data to the hard disk drive 2224 via the RAM 2214. The IC card drive reads the program and the data from an IC card, and/or writes the program and the data into the IC card.

The ROM 2230 stores therein a boot program or the like executed by the computer 2200 at the time of activation, and/or a program depending on a hardware of the computer 2200. The input/output chip 2240 may also connect various input/output units to the input/output controller 2220 via a parallel port, a serial port, a keyboard port, a mouse port, or the like.

A program is provided by a computer-readable medium such as the DVD-ROM 2201 or the IC card. The program is read from the computer-readable medium, is installed in the hard disk drive 2224, the RAM 2214, or the ROM 2230, which is also an example of the computer-readable medium, and is executed by the CPU 2212. Information processing written in these programs is read into the computer 2200, resulting in cooperation between a program and the above-described various types of hardware resources described above. An apparatus or a method may be constituted by realizing handling or processing of information in accordance with usage of the computer 2200.

For example, when communication is executed between the computer 2200 and an external device, the CPU 2212 may execute a communication program loaded onto the RAM 2214, and instruct the communication interface 2222 to process the communication based on the processing written in the communication program. Under control of the CPU 2212, the communication interface 2222 reads transmission data stored in a transmission buffering region provided in a recording medium such as the RAM 2214, the hard disk drive 2224, the DVD-ROM 2201, or the IC card, and transmits the read transmission data to the network, or writes reception data received from the network to a reception buffering region or the like provided on the recording medium.

Moreover, the CPU 2212 may cause all or a necessary portion of a file or a database to be read into the RAM 2214, the file and the database having been stored in an external recording medium such as the hard disk drive 2224, the DVD-ROM drive 2226 (DVD-ROM 2201), the IC card, or the like, and execute various types of processing on the data on the RAM 2214. The CPU 2212 then writes back the processed data to the external recording medium.

Various types of information such as various types of programs, data, tables, and databases may be stored in the recording medium, and undergo information processing. The CPU 2212 may execute, on the data read from the RAM 2214, various types of processing including various types of operations, information processing, conditional judgement, conditional branch, unconditional branch, information search/replacement, and the like as described throughout the present disclosure and designated by an instruction sequence of programs, and writes back the result to the RAM 2214. Moreover, the CPU 2212 may search for information in the file, the database, or the like in the recording medium. For example, when a plurality of entries each having an attribute value of a first attribute correlated with an attribute value of a second attribute, are stored in the recording medium, the CPU 2212 may search for an entry matching a condition whose attribute value of the first attribute is designated, from among the plurality of entries, and read the attribute value of the second attribute stored in the entry, thereby acquiring the attribute value of the second attribute correlated with the first attribute that satisfies a predetermined condition.

The program or the software module described above may be stored on the computer 2200 or in a computer-readable medium near the computer 2200. Moreover, a recording medium such as a hard disk or a RAM provided in a server system connected to a dedicated communication network or the Internet can be used as the computer-readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

100: equipment
200: equipment registration terminal
210: equipment information acquisition unit
220: position determination unit
230: positioning means storage unit
240: error estimation unit
250: equipment registration unit
610: distance measurement unit
620: measurement means storage unit
630: inclination/orientation determination unit
640: determination means storage unit
1010: supplementary information acquisition unit
2200: computer
2201: DVD-ROM
2210: host controller
2212: CPU
2214: RAM
2216: graphics controller
2218: display device
2220: input/output controller
2222: communication interface
2224: hard disk drive
2226: DVD-ROM drive
2230: ROM
2240: input/output chip
2242: keyboard

What is claimed is:

1. An equipment registration terminal comprising:
a position determination unit configured to determine a position of the equipment registration terminal;
a positioning means storage unit configured to store information on a positioning means to determine the position of the equipment registration terminal;
an error estimation unit configured to estimate a positioning error in the position of the equipment registration terminal based on the information on the positioning means; and
an equipment registration unit configured to register, in registration of a position of equipment to be registered by using the position of the equipment registration terminal, an error in the position of the equipment based on the positioning error, in an associated manner.

2. The equipment registration terminal according to claim 1, wherein
the positioning means storage unit is configured to store information indicating a positioning method in the positioning means, and
the error estimation unit is configured to estimate the positioning error according to the positioning method.

3. The equipment registration terminal according to claim 1, wherein
the positioning means storage unit is configured to store information indicating a version in the positioning means, and
the error estimation unit is configured to estimate the positioning error according to the version.

4. The equipment registration terminal according to claim 2, wherein
the positioning means storage unit is configured to store information indicating a version in the positioning means, and
the error estimation unit is configured to estimate the positioning error according to the version.

5. The equipment registration terminal according to claim 1, wherein
the positioning means storage unit is configured to store information indicating past positioning results in the positioning means; and
the error estimation unit is configured to estimate the positioning error according to the positioning results.

6. The equipment registration terminal according to claim 2, wherein
the positioning means storage unit is configured to store information indicating past positioning results in the positioning means; and
the error estimation unit is configured to estimate the positioning error according to the positioning results.

7. The equipment registration terminal according to claim 1, further comprising
a distance measurement unit configured to measure a distance from the position of the equipment registration terminal to the equipment, wherein
the equipment registration unit is configured to register the position of the equipment by further using the distance.

8. The equipment registration terminal according to claim 2, further comprising
a distance measurement unit configured to measure a distance from the position of the equipment registration terminal to the equipment, wherein
the equipment registration unit is configured to register the position of the equipment by further using the distance.

9. The equipment registration terminal according to claim 7, further comprising
a measurement means storage unit configured to store information on a measurement means to measure the distance, wherein
the error estimation unit is configured to estimate a measurement error in the distance based on the information on the measurement means, and
the equipment registration unit is configured to register an error in the position of the equipment further based on the measurement error, in an associated manner.

10. The equipment registration terminal according to claim 7, further comprising
an inclination/orientation determination unit configured to determine at least one of an inclination and orientation of the equipment registration terminal in the measurement of the distance, wherein the equipment registration unit is configured to register the position of the equipment by further using at least one of the inclination and orientation.

11. The equipment registration terminal according to claim 9, further comprising an inclination/orientation determination unit configured to determine at least one of an inclination and orientation of the equipment registration terminal in the measurement of the distance, wherein the equipment registration unit is configured to register the position of the equipment by further using at least one of the inclination and orientation.

12. The equipment registration terminal according to claim 10, further comprising a determination means storage unit configured to store information on a determination means to determine at least one of the inclination and orientation, wherein the error estimation unit is configured to estimate a determination error in at least one of the inclination and orientation based on the information on the determination means, and the equipment registration unit is configured to register an error in the position of the equipment further based on the determination error, in an associated manner.

13. The equipment registration terminal according to claim 12, wherein the determination means storage unit is configured to store correction information indicating information on correction to the determination means, and the error estimation unit is configured to estimate the determination error according to the correction information.

14. The equipment registration terminal according to claim 1, further comprising a supplementary information acquisition unit configured to acquire supplementary information on a place where the position of the equipment registration terminal has been determined, wherein the equipment registration unit is configured to further register the supplementary information.

15. The equipment registration terminal according to claim 2, further comprising a supplementary information acquisition unit configured to acquire supplementary information on a place where the position of the equipment registration terminal has been determined, wherein the equipment registration unit is configured to further register the supplementary information.

16. The equipment registration terminal according to claim 1, wherein the position determination unit is configured to determine the position of the equipment registration terminal by using a satellite positioning system.

17. The equipment registration terminal according to claim 2, wherein the position determination unit is configured to determine the position of the equipment registration terminal by using a satellite positioning system.

18. The equipment registration terminal according to claim 1, wherein the position determination unit is configured to determine the position of the equipment registration terminal by using an indoor positioning system.

19. An equipment registration method comprising:

determining a position of an equipment registration terminal;

storing information on a positioning means to determine the position of the equipment registration terminal;

estimating a positioning error in the position of the equipment registration terminal based on the information on the positioning means; and registering, in registration of a position of equipment to be registered by using the position of the equipment registration terminal, an error in the position of the equipment based on the positioning error, in an associated manner.

20. A recording medium having recorded thereon an equipment registration program that, when executed by a computer, causes the computer to function as:

a position determination unit configured to determine a position of an equipment registration terminal;

a positioning means storage unit configured to store information on a positioning means to determine the position of the equipment registration terminal;

an error estimation unit configured to estimate a positioning error in the position of the equipment registration terminal based on the information on the positioning means; and an equipment registration unit configured to register, in registration of a position of equipment to be registered by using the position of the equipment registration terminal, an error in the position of the equipment based on the positioning error, in an associated manner.

\* \* \* \* \*